June 5, 1934.  A. KATZOW  1,961,297
REFRIGERATING SYSTEM
Filed Oct. 23, 1931
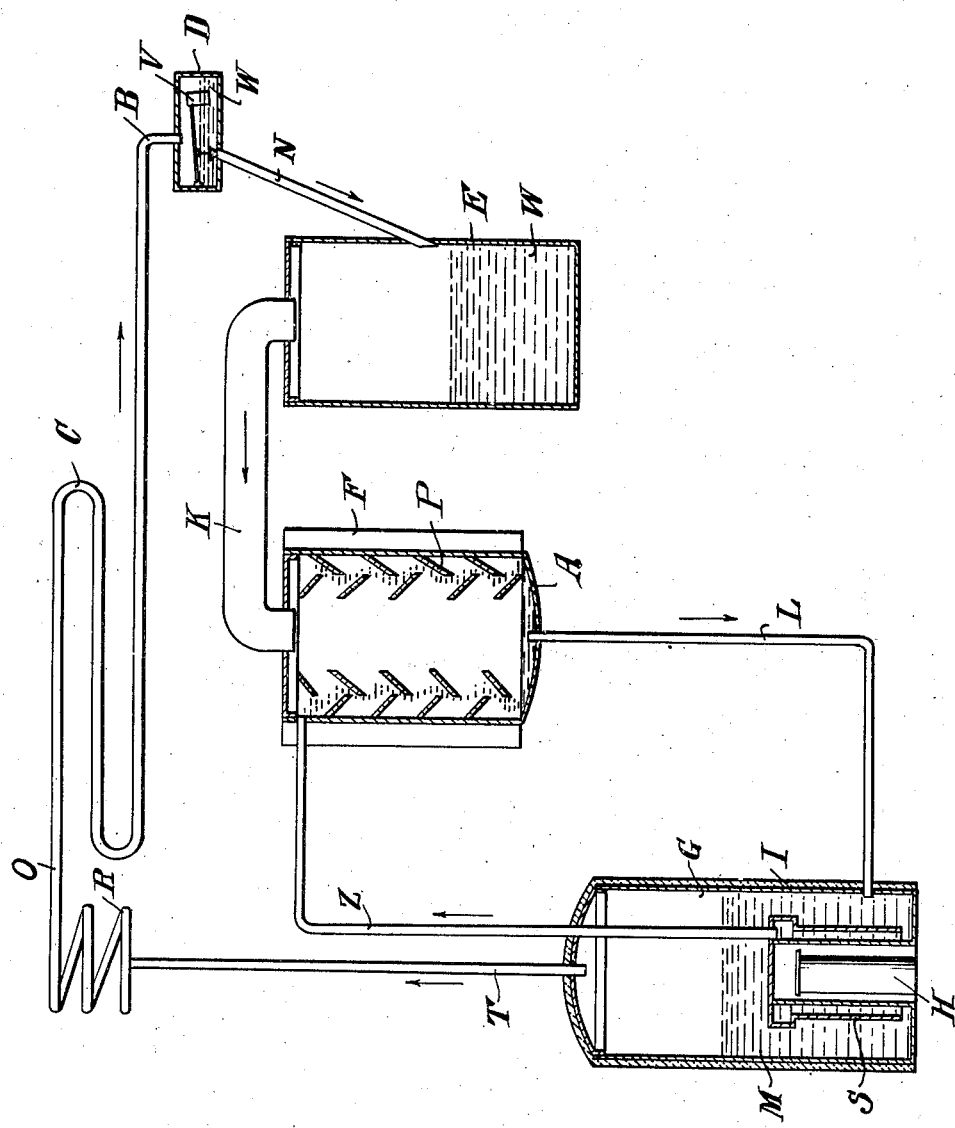
Inventor:
Abraham Katzow Patented June 5, 1934

1,961,297

UNITED STATES PATENT OFFICE 1,961,297

REFRIGERATING SYSTEM

Abraham Katzow, Indianapolis, Ind.

Application October 23, 1931, Serial No. 570,671

1 Claim. (Cl. 62—119)

The invention relates to refrigerating systems of absorption type which operate under pressures lower than atmospheric and include a generator, a rectifier, a condenser, an absorber, a float valve and an evaporator, forming a circuit for a refrigerant such as water. Obviously, other refrigerants may be used and it should be distinctly understood, however, that water is merely chosen for example only.

The refrigerant which is separated from the absorbent by application of heat, due to pressure and cooling medium condensed, due to vacuum evaporated, absorbed by the absorbent and again separated from the absorbent by application of heat.

One object of my invention is to provide a practical and efficient refrigerating system which operates under pressures lower than atmospheric.

Another object is to cause circulation of absorbent between and through the generator and absorber by direct application of heat to the absorbent flowing from the generator to the absorber.

Still another object is to provide a refrigerating system which is particularly effective for circulating the refrigerant.

Further object is to provide a hermetically sealed refrigerating system from which the air is drawn out and necessary vacuum maintained for the purpose of vaporization of refrigerant by circulating the absorbent between and through the generator and the absorber by direct application of heat.

Still further objects and features of the invention will be evident as the description proceeds with reference to the accompanying drawing in which, G designates the generator which contains a mixture M such as water dissolved in absorbent such as glycerol. Obviously other absorbents may be used.

The water vapor is separated from the mixture M in the generator G by application of heat increasing the pressure and causing a flow of water vapor through pipe T, rectifier R, and pipe O into the condenser C where due to increased pressure and due to cooling medium such as air circulated around the condenser C the water vapor condenses. From the condenser C the liquid W flows through pipe B into the float chamber D which contains a float valve V which maintains the increased pressure within the generator G, rectifier R, condenser C, and float chamber D and regulates the flow of liquid refrigerant through pipe N into the evaporator E. The rectifier R condenses and returns any entrained absorbent. Pipe T connects the upper part of the generator G with the lower part of the rectifier R. Generator G contains a siphon S which is connected by means of a pipe Z with the upper part of the absorber A and through which the absorbent flows from the generator G into the absorber A. The lower part of the absorber A is connected with the generator G by means of a pipe L through which a mixture of absorbent and refrigerant flows by gravity from the absorber A into the generator G. The absorber A is provided with baffling plates P to increase the absorption surface of the absorber A. The absorber A is air cooled and in order to increase heat radiation of the absorber A a series of heat radiating fins F surround the absorber A extending into the air and forming a large heat radiating surface. The evaporator E is connected with the absorber A by means of a pipe K through which the vaporized refrigerant flows from the evaporator E into the absorber A. The generator G and the siphon S are heated by means of an electric heating element H however, other known heating appliances may be used. Insulating material I surrounds the generator G to prevent the loss of heat. The condenser and the absorber are air cooled, however other means of cooling may be used. The air from the refrigerating system is drawn out and the refrigerating system hermetically sealed.

The operation of the invention is as follows:

Electric current is caused to flow through metal of the electric heating element H which offers resistance to the passage of the current thus producing heat. The heat from the electric heating element H is transmitted through the generator G to the mixture M within the generator G separating water vapor from the absorbent and increasing the pressure in the generator G and causing a flow of water vapor through the pipe T, rectifier R, and pipe O into the condenser C. In the condenser C the water vapor due to increased pressure and due to cooling medium circulated around the condenser C is condensed and as liquid W flows from the condenser C through pipe B into the float chamber D. Float chamber D contains a float valve V which maintains the increased pressure within the generator G, rectifier R, condenser C, and float chamber D and regulates the flow of liquid refrigerant from the float chamber D through the pipe N into the evaporator E. Heating the generator G and the siphon S causes the absorbent which is separated by heat from the refrigerant to flow through the siphon S and pipe Z into the absorber A. In the absorber A the absorbent flowing between the baffling plates P absorbs the water vapor which enters the absorber A from the evaporator E through the pipe K. From the absorber A the mixture of absorbent and refrigerant flows by gravity through the pipe L into the generator G. By absorbing the water vapor in the absorber A the vacuum in the absorber A, pipe K, and evaporator E which are interconnected is increased causing a flow of vaporized refrigerant from the evaporator E through pipe K into the absorber A in which the vaporized refrigerant is absorbed by the absorbent. The mixture of refrigerant and absorbent flows by gravity through the pipe L into the generator G. The level of the mixture in the generator G and pipe L will depend on the pressure necessary to condense the refrigerant used.

It will be seen that there are two cycles of circulation in the above described refrigerating system one for refrigerant through the generator, rectifier, condenser, float chamber, evaporator and absorber the other for absorbent through the generator and absorber.

While I have given specific descriptions of my invention, it is to be understood that the invention is not limited to these specific descriptions as many variations may be made which would come within the spirit and scope of the invention.

What I claim is:—

In a refrigerator of the absorption type, a heater, an absorber, a rectifier at a level higher than the heater, a pipe connecting the vapor-space of the rectifier with the lower part of the rectifier, a condenser having an inlet connected with the vapor-space of the rectifier, an evaporator, means interposed between said condenser and said evaporator for maintaining a pressure differential therebetween, a pipe connecting the vapor-space of the evaporator with the absorber, a pipe connecting the lower region of the absorber with the heater and forming a liquid seal between the absorber and heater with a gravity head against the heater, and a pipe forming a communication between the absorber and the heater, the inlet of said last-mentioned pipe having a siphon connection with a region of the heater below minimum liquid level therein, said system having a rarified atmosphere below normal atmospheric pressure and containing a volume of refrigerant which is liquid at atmospheric temperatures and pressures, and a liquid absorbent for said refrigerant, of less volume than the total capacity of the system.

ABRAHAM KATZOW.